(12) United States Patent
Salim et al.

(10) Patent No.: US 12,501,454 B2
(45) Date of Patent: Dec. 16, 2025

(54) SIDELINK RESOURCE SELECTION BASED ON USER EQUIPMENT COORDINATION

(71) Applicant: Huizhou TCL Cloud Internet Corporation Technology Co., Ltd., Guangdong (CN)

(72) Inventors: Umer Salim, Guangdong (CN); Virgile Garcia, Guangdong (CN)

(73) Assignee: Huizhou TCL Cloud Internet Corporation Tech, Guangdong (CN)

( * ) Notice: Subject to any disclaimer, the term of this patent is extended or adjusted under 35 U.S.C. 154(b) by 386 days.

(21) Appl. No.: 18/005,855

(22) PCT Filed: Aug. 4, 2021

(86) PCT No.: PCT/CN2021/110626
§ 371 (c)(1),
(2) Date: Jan. 18, 2023

(87) PCT Pub. No.: WO2022/028490
PCT Pub. Date: Feb. 10, 2022

(65) Prior Publication Data
US 2023/0292347 A1 Sep. 14, 2023

Related U.S. Application Data

(60) Provisional application No. 63/060,821, filed on Aug. 4, 2020.

(51) Int. Cl.
*H04W 72/40* (2023.01)
*H04W 72/54* (2023.01)
*H04W 72/566* (2023.01)

(52) U.S. Cl.
CPC .......... *H04W 72/40* (2023.01); *H04W 72/54* (2023.01); *H04W 72/566* (2023.01)

(58) Field of Classification Search
None
See application file for complete search history.

(56) References Cited

U.S. PATENT DOCUMENTS

2020/0029340 A1 1/2020 He
2020/0112970 A1 4/2020 Manolakos
(Continued)

FOREIGN PATENT DOCUMENTS

CN 108696935 A 10/2018
CN 109392015 A 2/2019
(Continued)

OTHER PUBLICATIONS

European Search Report in European application No. 21853815.5, mailed on Jul. 15, 2024.
(Continued)

*Primary Examiner* — Nicholas Sloms
(74) *Attorney, Agent, or Firm* — PV IP PC; Wei Te Chung

(57) ABSTRACT

A method for selecting resources for a transmission between a first UE and a second UE is disclosed. A set of coordination resources is determined at the first UE. The set of coordination resources includes coordination information which may indicate whether the set of coordination resources are preferred resources and/or non-preferred resources. The set of coordination resources is sent to the second UE, and the second UE takes the coordination information into account in the resource selection for its own transmission. For example, the resource selection by the second UE may be based on both the sensing result of the second UE and the received coordination information from the first UE. Alternatively, there source selection by the second UE may be based exclusively or non-exclusively on the received coordination information from the first UE.

12 Claims, 11 Drawing Sheets

(56) References Cited

U.S. PATENT DOCUMENTS

| | | | |
|---|---|---|---|
| 2020/0221423 A1 | 7/2020 | Wang | |
| 2020/0280961 A1* | 9/2020 | Lee | .................. H04W 4/40 |
| 2023/0254817 A1* | 8/2023 | Zhao | .................. H04B 17/328 |
| | | | 370/329 |
| 2024/0015845 A1* | 1/2024 | Mohammad Soleymani | .............. |
| | | | H04W 76/28 |

FOREIGN PATENT DOCUMENTS

| | | |
|---|---|---|
| CN | 109478991 A | 3/2019 |
| CN | 109716837 A | 5/2019 |
| CN | 111149397 A | 5/2020 |
| CN | 111436149 A | 7/2020 |
| EP | 3432657 A1 | 1/2019 |
| EP | 3550905 A1 | 10/2019 |
| WO | 2018027528 A1 | 2/2018 |
| WO | 2018031086 A1 | 2/2018 |
| WO | 2020072213 A1 | 4/2020 |
| WO | 2020143773 A1 | 7/2020 |

OTHER PUBLICATIONS

International Search Report in International application No. PCT/CN2021/110626, mailed on Nov. 3, 2021.
Written Opinion of the International Search Authority in International application No. PCT/CN2021/110626, mailed on Nov. 3, 2021.
Chinese Office Action issued in corresponding Chinese Patent Application No. 202180058304.1 dated Jun. 4, 2025, pp. 1-6.

* cited by examiner

SIDELINK RESOURCE SELECTION BASED ON USER EQUIPMENT COORDINATION

CROSS REFERENCE TO RELATED APPLICATIONS

This application is a US national phase application based upon an International Application No. PCT/CN2021/110626, filed on Aug. 4, 2021, which claims priority to U.S. Provisional Patent Application No. 63/060,821, filed on Aug. 4, 2020, and entitled "Sidelink Resource Selection Based on User Equipment Coordination". The entire disclosures of the above application are incorporated herein by reference.

TECHNICAL FIELD

The following disclosure relates sidelink resource selection, in particular based on user equipment coordination.

BACKGROUND

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN &CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

NR has added a lot of capabilities and technical features to the wireless strategies going way beyond LTE for operation on licensed spectrum. In addition, the NR protocols are intended to offer options for operating in unlicensed radio bands, to be known as NR-U. When operating in an unlicensed radio band the gNB and UE must compete with other devices for physical medium/resource access. For example, Wi-Fi, NR-U, and LAA may utilise the same physical resources.

A trend in wireless communications is towards the provision of lower latency and higher reliability services. For example, NR is intended to support Ultra-reliable and low-latency communications (URLLC) and massive Machine-Type Communications (mMTC) are intended to provide low latency and high reliability for small packet sizes (typically 32 bytes). A user-plane latency of 1 ms has been proposed with a reliability of 99.99999%, and at the physical layer a packet loss rate of $10^{-5}$ or $10^{-6}$ has been proposed.

mMTC services are intended to support a large number of devices over a long life-time with highly energy efficient communication channels, where transmission of data to and from each device occurs sporadically and infrequently. For example, a cell may be expected to support many thousands of devices.

The disclosure below relates to various improvements to cellular wireless communications systems.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Figure 1:
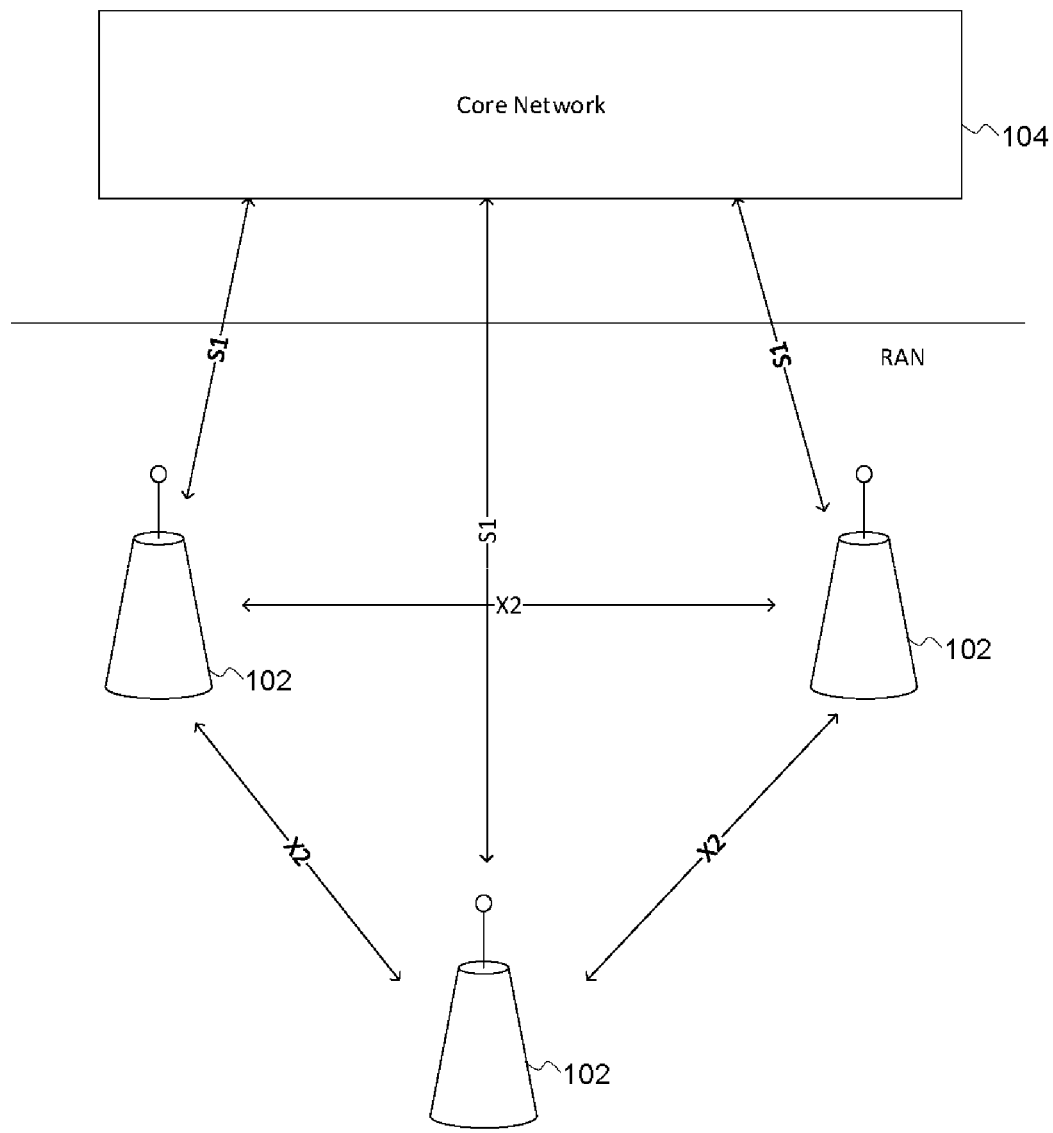
FIG. 1 shows selected elements of a cellular wireless communication network.

FIG. 1 shows a schematic diagram of three base stations 102 (for example, eNB or gNBs depending on the particular cellular standard and terminology) forming a cellular network. Typically, each of the base stations 102 will be deployed by one cellular network operator to provide geographic coverage for UEs in the area. The base stations form a Radio Area Network (RAN). Each base station 102 provides wireless coverage for UEs in its area or cell. The base stations 102 are interconnected via the X2 interface and are connected to a core network 104 via the S1 interface. As will be appreciated only basic details are shown for the purposes of exemplifying the key features of a cellular network. The interface and component names mentioned in relation to FIG. 1 are used for example only and different systems, operating to the same principles, may use different nomenclature.

The base stations 102 each comprise hardware and software to implement the RAN's functionality, including communications with the core network 104 and other base stations 102, carriage of control and data signals between the core network and UEs, and maintaining wireless communications with UEs associated with each base station. The core network 104 comprises hardware and software to implement the network functionality, such as overall network management and control, and routing of calls and data.

In vehicle-to-vehicle (V2V) applications, the UEs may be incorporated into vehicles such as cars, trucks and buses. These vehicular UEs are capable of communicating with each other in in-coverage mode, where a base station manages and allocates the resources and in out-of-coverage mode, without any base station managing and allocating the resources. In vehicle-to-everything (V2X) applications, the vehicles may be communicating not only with other vehicles, but also with infrastructure, pedestrians, cellular networks and potentially other surrounding devices. V2X use cases include:

Vehicles Platooning—this enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.

Extended Sensors—this enables the exchange of raw or processed data gathered through local sensors or live video images among vehicles, road site units, devices of pedestrian and V2X application servers. The vehicles can increase the perception of their environment beyond of what their own sensors can detect and have a broader and holistic view of the local situation. High data rate is one of the key characteristics.

Advanced Driving—this enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.

Remote Driving—this enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Figure 2:
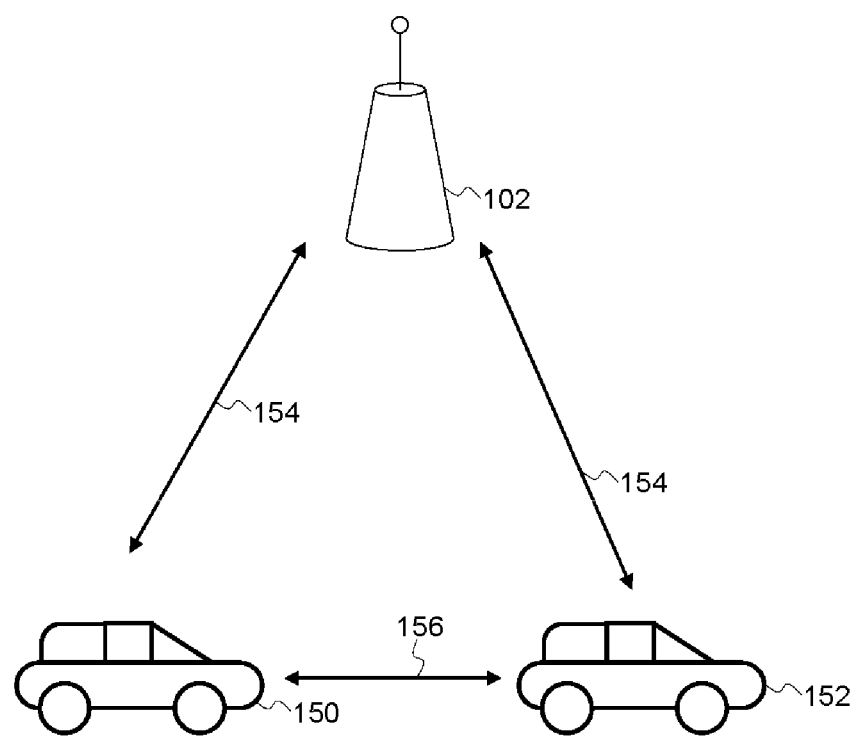
FIG. 2 shows selected elements in a Radio Area Network of the cellular wireless communication network of FIG. 1.

FIG. 2 illustrates a base station 102 forming a RAN, and a transmitter (Tx) UE 150 and a receiver (Rx) UE 152 in the RAN. The base station 102 is arranged to wirelessly communicate over respective connections 154 with each of the Tx UE 150, i.e. UE-A, and the Rx UE 152, i.e. UE-B. The Tx UE 150 and the Rx UE 152 are arranged to wirelessly communicate with each other over a sidelink 156.

Sidelink transmissions utilise TDD (half duplex) on either a dedicated carrier, or a shared carrier with conventional Uu transmissions between a base station and UE. Resource pools of transmission resources are utilised to manage resource and allocation and manage interference between potentially concurrent transmissions. A resource pool is a set of time-frequency resources from which resources for a transmission can be selected. UEs can be configured with multiple transmit and receive resource pools.

Two modes of operation are used for resource allocation for sidelink communication depending on whether the UEs are within coverage of a cellular network. In Mode 1, the V2X communication is operating in-coverage of the base stations (eg eNBs or gNBs). All the scheduling and the resource assignments may be made by the base stations.

Mode 2 applies when the V2X services operate out-of-coverage of cellular base stations. Here the UEs need to schedule themselves. For fair utilization, sensing-based resource allocation is generally adopted at the UEs. In Mode 2, UEs reserve resources for a transmission by transmitting a Sidelink Control Information (SCI) message indicating the resources to be used. The SCI notifies the recipient (which may be a single UE in unicast, a group of UEs in groupcast, or all reachable UEs in broadcast) of the details of the transmission it can expect. UEs may reserve transmission resources both for a first transmission of a Transport Block (TB) of data, and also for transmitting repetitions of the TB to improve reliability if the initial transmission fails.

Figure 3:
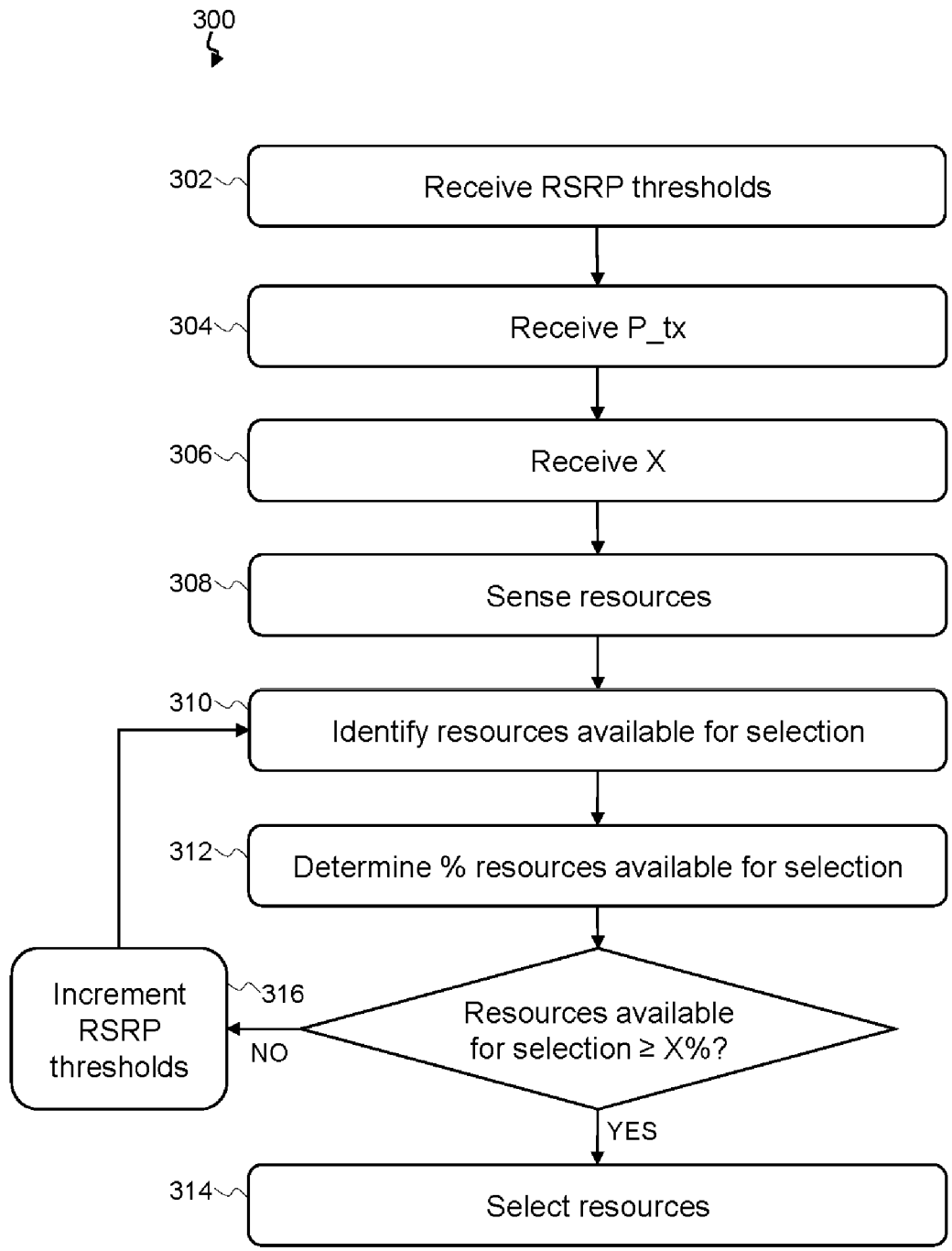
FIG. 3 shows a method of resource selection.

FIG. 3 illustrates a method 300 of resource selection in Mode 2 carried out by a UE. At step 302, a processor of the UE receives initial Reference Signal Received Power (RSRP) thresholds. These thresholds are configured for each pair of priority values, where one priority is the priority of own transmission for which UE is performing resource selection, and the other priority is the priority of the detected transmission. At step 304, the processor of the UE receives a priority for the intended transmission, P_tx. At step 306, the processor of the UE receives a value, X, for the percentage of identified resources. The value of X may be a percentage between 0 and 100. Currently the supported values of X are 20, 35 and 50.

At step 308, the UE senses resources within the resource selection window for the intended transmission. Resource selection window includes the future resources over which the UE will select the suitable resource for transmission. This includes the UE receiving a value for priority of the sensed reservation, P_rx, and an RSRP value in dB. RSRP value is the estimated RSRP value for the received reservation, and P_rx is the priority of the detected transmission/reservation as indicated in sidelink control information. At step 310, the processor of the UE identifies, based on the RSRP thresholds and value of P_tx, which of the sensed resources from step 308 are selectable. The identification at step 310 may comprise the UE comparing the RSRP of the detected reservation with the threshold to identify this resource as candidate or not. All the resources having received RSRP larger than the RSRP threshold for the relevant priority pair may be removed from the candidate list. At step 312, the processor of the UE determines the proportion of selectable resources relative to the number of sensed resources from step 308. If the proportion of resources available for selection identified at step 312 is greater than or equal to X, then the method 300 proceeds to step 314. At step 314, the processor of the UE selects resources to use from the resources available for selection identified at step 312. Selection of resources at step 314 may be a random selection form the resources available for selection identified within some constraints, e.g. Hybrid automatic repeat request (HARQ) feedback timing or delay between the resources when multiple resources need to be selected.

If following step 312, the proportion of resources available for selection identified at step 312 is less than X, then the method 300 proceeds to step 316. At step 316, the processor of the UE increases the RSRP thresholds. The increase of the RSRP thresholds may be by 3 dB. In some cases, the increase in the RSRP thresholds can be by a fixed configured offset value applied to all thresholds for the priority pairs. The method 300 then returns to step 310 in which the processor of the UE identifies, based on the (increased) RSRP thresholds and value of P_tx, which of the sensed resources from step 308 are selectable.

As the RSRP thresholds may be increased at step 316, this may mean that the resources for the transmissions detected at step 308 with priority higher than the UE's intended transmission priority, P_tx, become part of available candidate resources.

Figure 4:
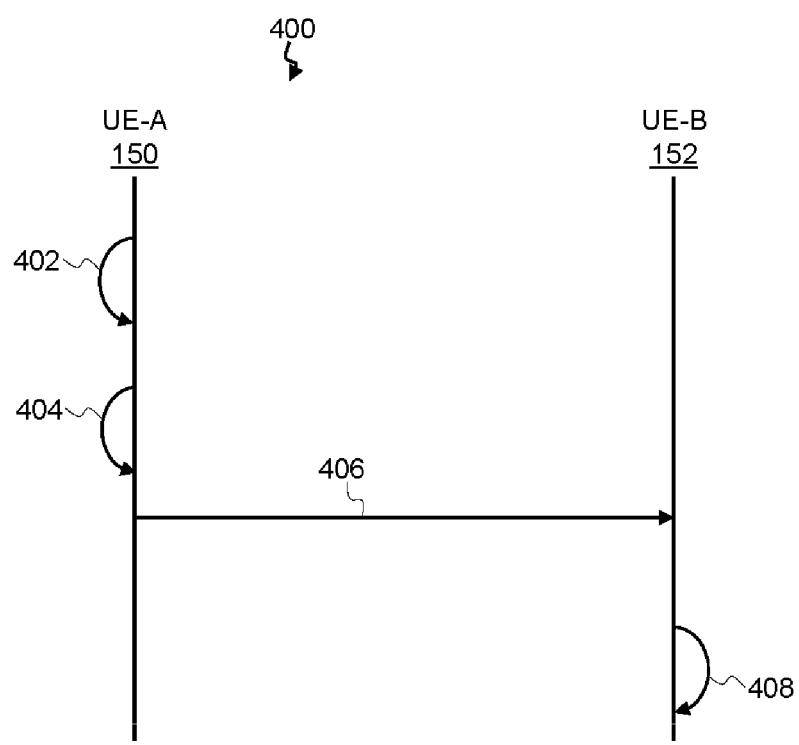
FIG. 4 shows a dataflow between two UEs.

FIG. 4 shows a process 400 between UE-A and UE-B. At step 402, UE-A performs the resource selection method 300. At step 404, the UE determines a set of coordination resources. This may comprise determining a set of preferred resources according to a predetermined criterion, or the resources which are simply available if the UE performs sensing for resource selection. Additionally, the UE may apply a second criterion, for example the set of resources with lowest received signal energy. This criterion can be in the form of resources where the UE does not intend to transmit itself. These enable the UE to determine a set of preferred resources with the aim of increasing decoding probability if transmitted. Step 404 may comprise the UE determining a set of resources which are not suitable for the UE from reception point of view. As an example, if the UE performs an indicative resource selection, the resources detected with periodic reservations and/or large enough RSRP are not suitable resources to transmit data to the UE. Similarly, the set of resources where the UE-A itself is transmitting or intends to transmit are not suitable for its reception as due to duplexing, the UE-A will not be able to receive anything. There may be other criterion to determine a set of non-preferred resources that the UE does not consider suitable. If UE-A does not use the sensed resources from step 402 to determine a set of coordination resources in step 404, step 402 may be removed from the process 400.

At step 406, UE-A transmits to UE-B, e.g. using sidelink 156, the set of coordination resources determined by UE-A at step 404, where the resources indicated could be preferred resource and/or non-preferred resources. Step 406 may include coordination information indicating whether the set of coordination resources belong to preferred resources or non-preferred resources or both. In addition, as the coordination bits are limited, the resources may be indicated with a given periodicity which might be explicitly indicated as well. Thus, UE-B may expand the coordination information by adding all the extensions which are derivable from the indicated coordination implicitly, or by using the prior configuration or indicated explicitly as part of the coordination information. The set of preferred resources or set of non-preferred resources may include the resources indicated explicitly and their extensions which are added by UE-B based upon implicit or explicit indication.

At step 408, UE-B performs resource selection. UE-B may perform resource selection method 300, 500, 600 or 800.

Figure 5:
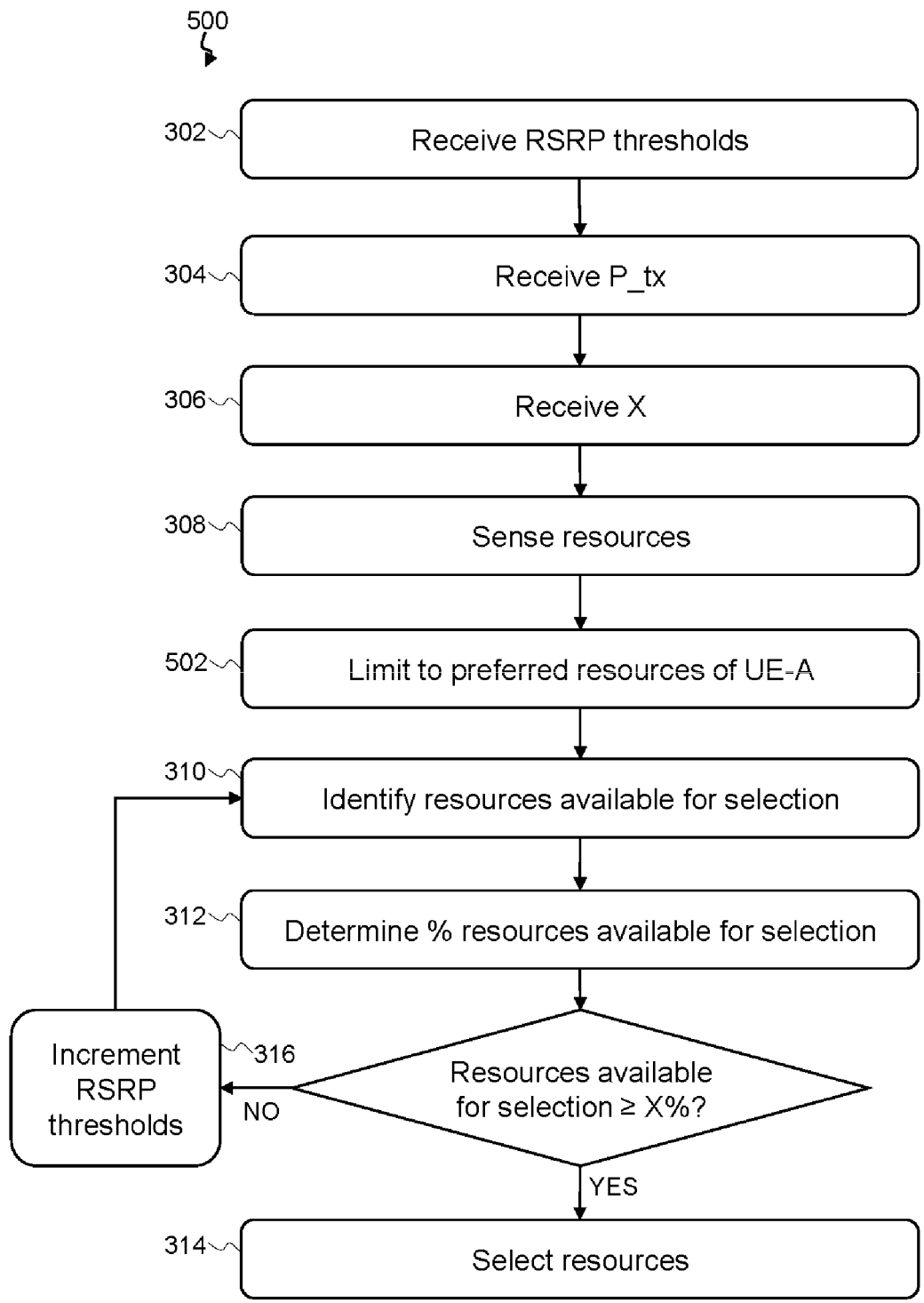
FIG. 5 shows a method of resource selection.

FIG. 5 illustrates the method 500 of resource selection in Mode 2 carried out by a UE when the resources indicated by the UE-A at step 406 are preferred resources. The method 500 is substantially the same as method 300. Method 500 includes a step 502 between steps 308 and 310. At step 502, the processor of the UE excludes from selection any resources from the set of sensed resources that are not indicated as preferred by UE-A based on the indication received at step 406. In other words, UE-B identifies resources available for selection from the set of coordination resources received at step 406.

As the coordination information, even with extensions for periodic resources etc., may be a small set of resources, the identified candidate resources for UE-B may be less than X %. As such, a low value of X may be used by UE-B. 3GPP Release-16 only supports 20, 35 and 50 as allowable values of X and one of these is configured for use as part of resource selection. For resource selection based upon coordination information, further lower values may be useful due to limited amount of resources which can be exchanged as part of coordination information. For this purpose, lower values of X such as 5, 10 and 15 may be supported. Additionally or alternatively, a resource pool configuration may configure two values of X as part of resource pool configuration: a higher value of X for resource selection and a lower value of X for resource selection in preferred resource-based coordination, i.e. as carried out by UE-B. In a slight variation, the definition of X can be modified. For use in resource selection with preferred resources, the definition of X can be updated to be the ratio of number of preferred resources available for selection to the number of preferred resources in the resource selection window.

Figure 6:
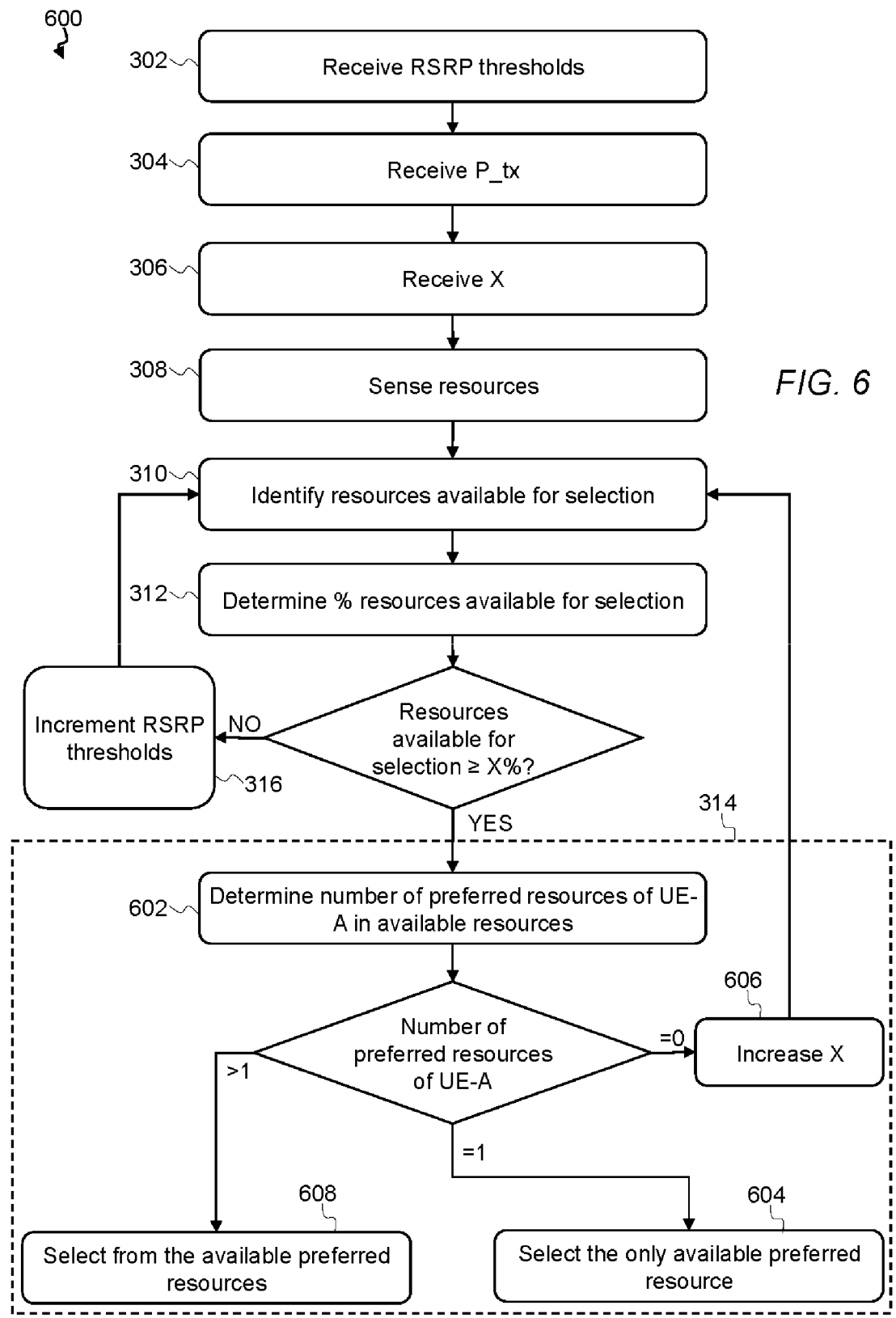
FIG. 6 shows a method of resource selection.

FIG. 6 illustrates the method 600 of resource selection in Mode 2 carried out by a UE when the resources indicated by the UE-A at step 406 are preferred resources. The method 600 is substantially the same as method 300. In method 600, the step 314 includes a step 602 in which the processor of UE-B determines the number of preferred resources of UE-A (i.e. based on indication received at step 406) in available resources identified at step 310. As a transmission may involve more than one repetition, this document uses the terminology of resource for one transmission which in turn may comprise more than one physical time-frequency resource to accommodate the suitable number of repetitions. This step may also ensure that the selected transmission resources among the preferred resources satisfy the HARQ and other timing requirements of step 314. If the number determined at step 602 is one, then at step 604, UE-B selects the one available resource from the preferred set as the final resource for transmission. If the number determined at step 602 is zero, then at step 606, UE-B selects a higher value of X and the process returns to step 310. The closest allowed value of X can be used in this case which is higher than the currently selected value. In a slight variation, a fixed offset can be added to the current value of X to get a higher value. This offset can be 5 (for an increase of 5%) or a suitable value.

If the number determined at step 602 is more than one, then at step 608, UE-B selects one of the available resources that are in the preferred set of resources of UE-A. The selection at step 608 may be random. Alternatively, the selection at step 608 may be based on the preferred resource with the lowest received RSRP value. With coordination between UEs, the resource quality perspective changes among the neighboring UEs as coordination information is incorporated. Thus, random selection may not be as useful as in the case without coordination. When the criterion of lowest received RSRP is applied, this results in selection of a preferred resource with the least interference power in a deterministic fashion.

Alternatively, the selection at step 608 may be based on the preferred resource earliest in time window. Selection of earliest preferred resource provides a latency advantage which in turn can improve the latency directly and reliability indirectly by providing more re-transmission opportunities.

Both methods 500 and 600 ensure that the final resource selected for transmission is one of the preferred resource indicated by UE-A. For this purpose, both methods 500 and 600 may iterate multiple times over the resource identification procedure until at least one of the preferred resource becomes part of the identified candidate resource. Nevertheless, due to wireless nature of medium, the preferred resource indicated by UE-A may not necessarily be the best choice when UE-B will transmit data to UE-A. For example, there could be high priority ongoing communications near UE-B which may face severe degradation if UE-B transmits over this resource despite UE-A considering this resource favourable.

Figure 7:
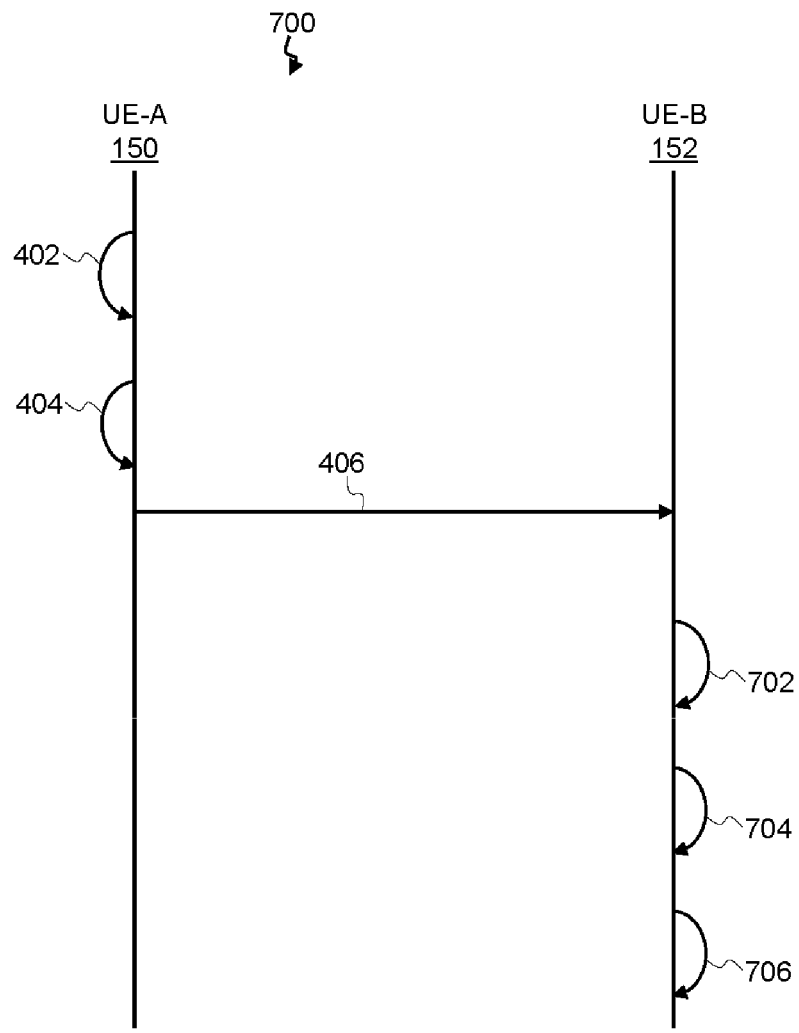
FIG. 7 shows a dataflow between two UEs.

FIG. 7 shows a process 700 between UE-A and UE-B. Steps 402, 404 and 406 of the process 700 are substantially the same as in process 400. At step 702, UE-B performs the method 300 to select a resource to transmit. At step 704, UE-B performs the method 500 or 600 to select a resource of the preferred resources of UE-A. Step 704 may be carried out before, after or in parallel to step 702. At step 706, UE-B compares the received energy of the selected resources from steps 702 and 704. If the received energy over the preferred selected resource from step 704 is higher than the received energy over the selected resource from step 702 beyond a predetermined threshold, UE-B chooses the selected resource from step 702 as the final resource for transmission. Otherwise, UE-B chooses the preferred selected resource from step 704 as the final resource for transmission. If UE-B has detected transmission (e.g. SCI) over both the preferred selected resource from 704 and the selected resource from step 702, the received energy is measured with respect to RSRP. Otherwise the comparison is done with respect to simple receive energy, e.g. receive signal strength indicator (RSSI). The acceptable margin threshold for the preferred selected resource may be configured as part of resource pool configuration. This defines the margin within which an indicated preferred resource will be selected for transmission over a normal selected resource. Beyond this threshold, the indicated preferred resources are considered not suitable due to bad quality seen at the transmitting UE, UE-B, and hence ignored for resource selection.

Accordingly, steps 702, 704 and 706 includes a mechanism of quality check on the preferred resources indicated by UE-A. Thus, UE-B tries to choose one of the preferred resources indicated by UE-A, but beyond a certain loss of quality compared to a resource selected without coordination, UE-B will switch to the use of resource which is selected without taking into account the coordination information received at step 406.

Figure 8:
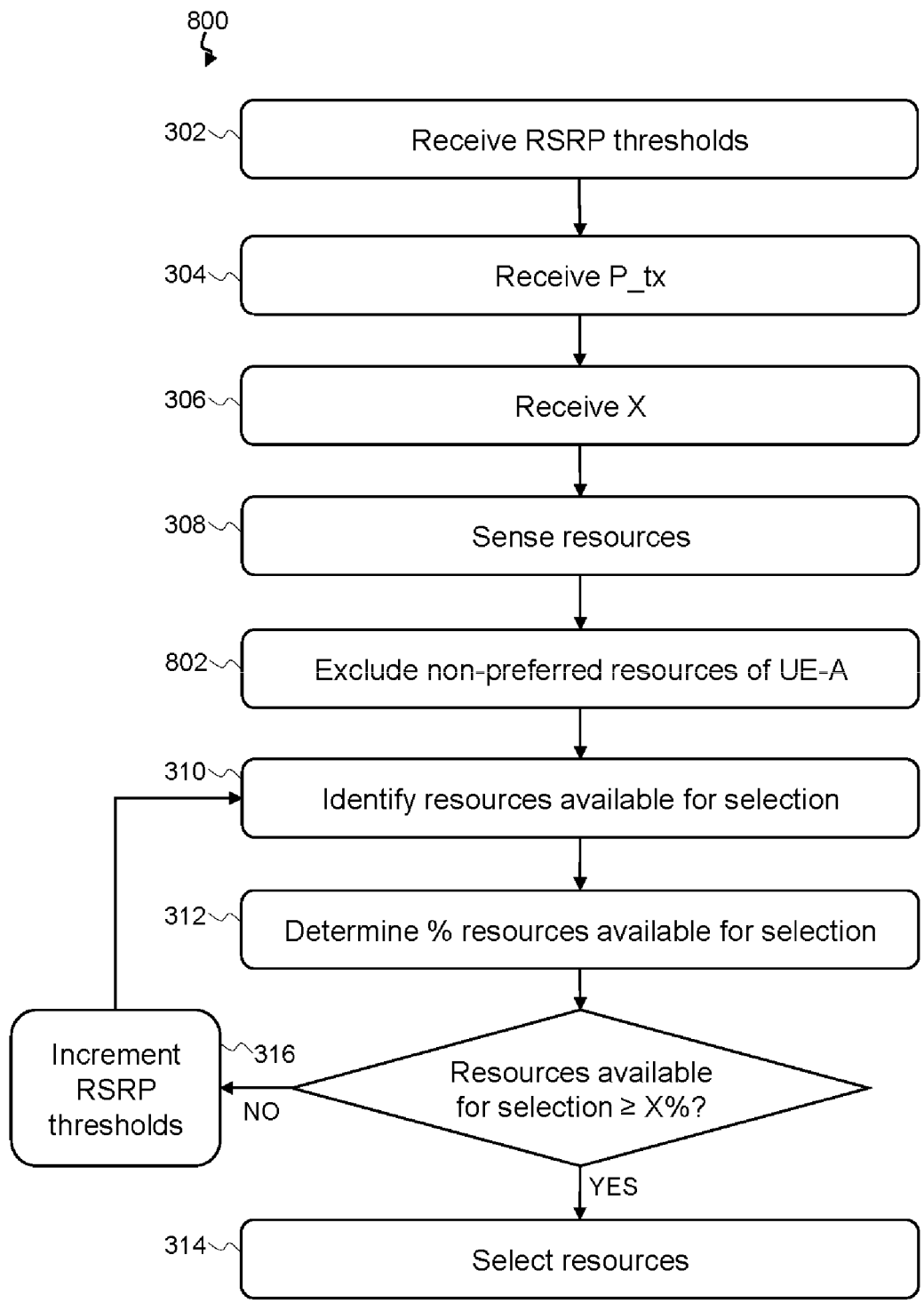
FIG. 8 shows a method of resource selection.

FIG. 8 illustrates the method 800 of resource selection in Mode 2 carried out by a UE when the resources indicated by the UE-A at step 406 are non-preferred resources. The method 800 is substantially the same as method 300. Method 800 includes a step 802 between steps 308 and 310. At step 802, the processor of the UE excludes from selection any resources from the set of sensed resources that are indicated as non-preferred by UE-A based on the indication received at step 406. As a result, UE-B identifies resources available for selection from the sense resources without the non-preferred resources of UE-A. The resources which are excluded from the resource selection window comprise directly indicated resources from UE-A and all of their extensions as per the configuration. Thus, the candidate resources from step 310 is guaranteed to have no non-preferred indicated resource as all such resources were excluded from the resource selection window.

Method 800 may be suitable when coordination information of non-preferred resources is prepared such that UE-A is not able to receive over the indicated resource set. This can be the case, for example, when the non-preferred resources are where UE-A plans to transmit. Thus, due to duplexing reasons, it may not be able to receive anything over such resources.

Figure 9:
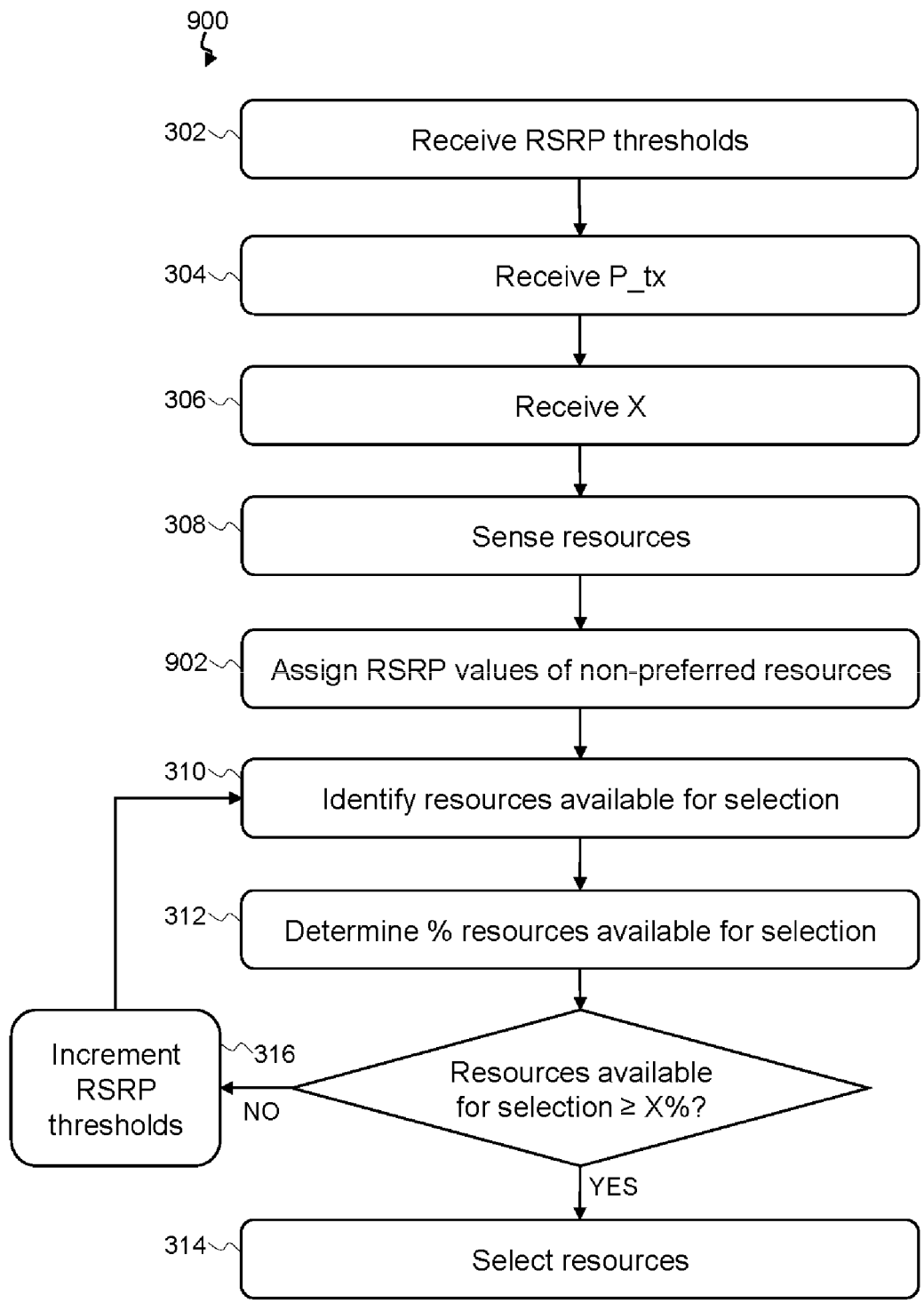
FIG. 9 shows a method of resource selection.

FIG. 9 illustrates the method 900 of resource selection in Mode 2 carried out by a UE when the resources indicated by the UE-A at step 406 are non-preferred resources. The method 900 is substantially the same as method 300. Method 900 includes a step 902 between steps 308 and 310. At step 902, the processor of the UE assigns an indicative RSRP value to all the non-preferred resources (and their extensions) of UE-A indicated at step 406. This serves to assign a negative weight to these non-preferred resources in the resource selection procedure. In one approach, UE-B may assign, at step 902, the following RSRP values to the indicated non-preferred resources of UE-A:

RSRP for a non-preferred resource=RSRP_estimated+RSRP_indicated_offset

RSRP_indicated_offset is the offset which is added to the estimated RSRP value of step 308 which may be configured as part of the resource pool configuration. When RSRP_indicated_offset is configured to a very large value, it effectively results in resource exclusion for the non-preferred resources. The priority of the resource is kept as of the SCI detected over such non-preferred resource.

In another approach, UE-B may assign, at step 902, RSRP values based on the maximum of the estimated RSRP and a configured RSRP value:

RSRP for a non-preferred resource=max(RSRP_estimated,RSRP_configured)

In the event that UE-B does not detect an SCI over a resource indicated by UE-A as a non-preferred resource (and so UE-B has no RSRP estimate and no priority to be assigned to this non-preferred resource), the UE-B may assign a pre-configured RSRP value to such non-preferred resource where an SCI is not detected. This RSRP value may be part of resource pool configuration. In addition, such resources may be associated the lowest priority value. Allocating the lowest priority value may be acceptable for the UE-B's perspective as the UE-B did not detect an SCI over this resource.

Method 900 provides scheduling flexibility and increases the size of the set of available resources for UE-B.

Figure 10:
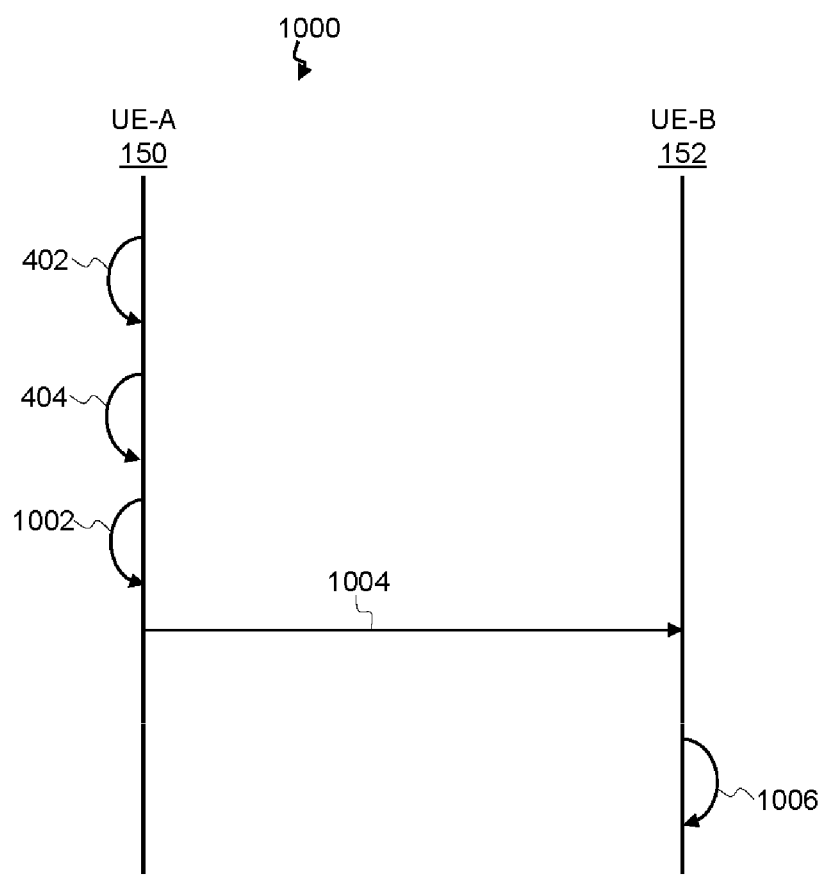
FIG. 10 shows a dataflow between two UEs.

FIG. 10 shows a process 1000 between UE-A and UE-B. Steps 402 and 404 of the process 1000 are substantially the same as in process 400. Before step 406, at step 1002, UE-A allocates each non-preferred resource into one of a predetermined number of groups, i.e. ranking the non-preferred resources. At step 1002, UE-A also assigns indicative RSRP values for each resource based on its group. For example:

A first group may be resources where UE-A plans to transmit. This subset of non-preferred resources can be indicated with an RSRP value of infinity.

A second group where UE-A has received indication that a different UE-C intends to transmit to UE-A. UE-A can indicate a high RSRP value to this group as well, which can be taken to be infinity or a suitable value.

A third group may be where UE-A detects transmissions with an RSRP in a given range and a priority higher than a given priority. This can be considered as combination of priority and RSRP to be avoided when UE-B will transmit to UE-A. UE-A will indicate an RSRP value to this group of resources for identification at UE-B. A different mapping techniques can be applied which lets the UE-B determine the range of priority and RSRP values for this set of resources.

The third group represents the set of resources having priorities and RSRP in a given range to be avoided. Additional such groups may be defined with different priority and RSRP values, and for each group UE-A will assign a single indicative RSRP value. A suitable number of such groups may be defined to achieve a predetermined number of coordination information bits to be exchanged between the UEs. In an extreme case, a single RSRP value and an associated RSRP range may be used. At step 1004, UE-A transmits to UE-B an indication of the set of non-preferred resources along with a metric indicating the group/ranking of the non-preferred resource and the indicative RSRP values for each resource.

Figure 11:
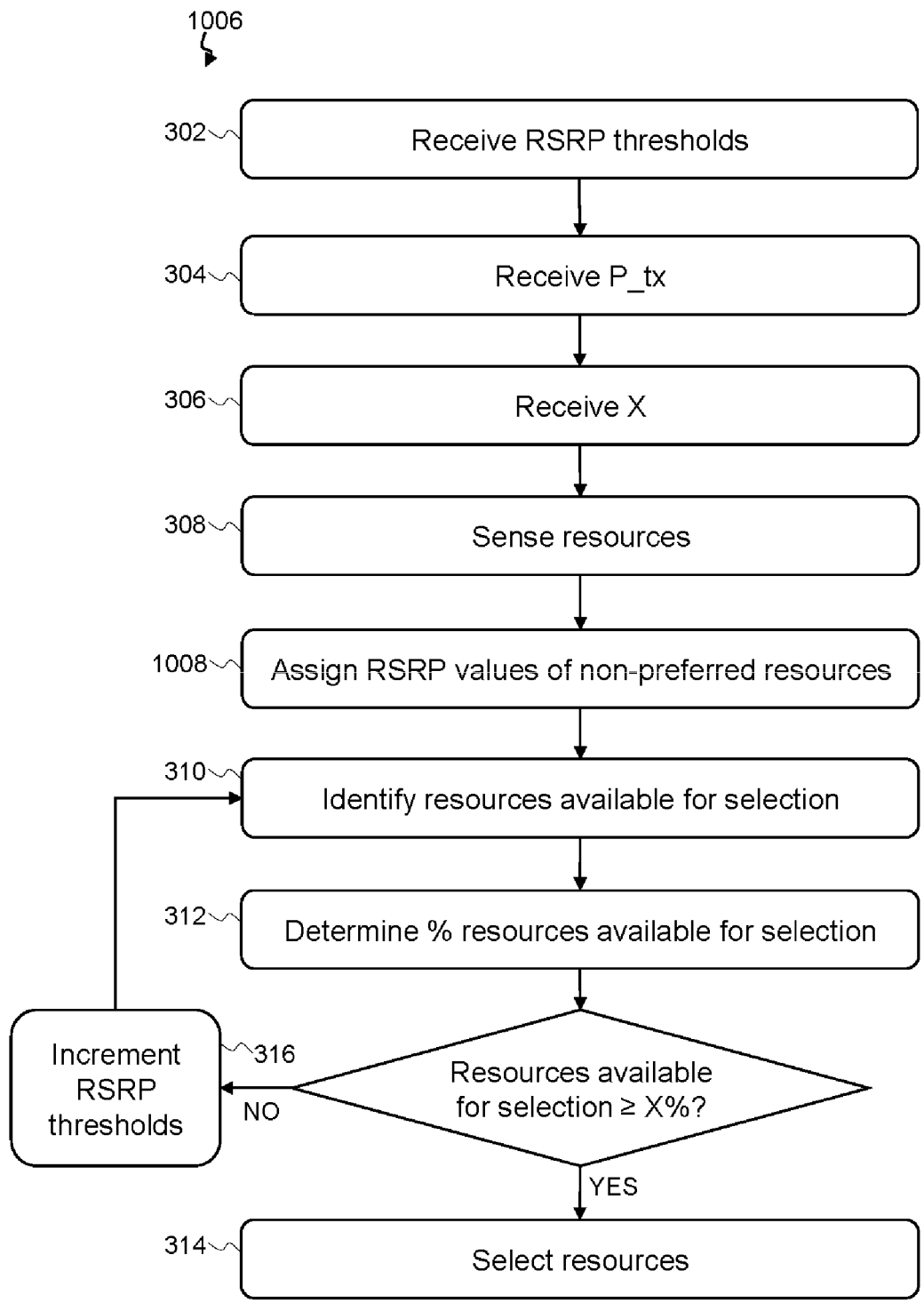
FIG. 11 shows a method of resource selection.

At step 1006, UE-B performs resource selection. FIG. 11 illustrates the method 1006 of resource selection in Mode 2 carried out by a UE when the resources indicated by the UE-A at step 1004 are non-preferred resources and sent with a metric indicating the group/ranking of the non-preferred resource. The method 1006 is substantially the same as method 300 and similar to method 900. Method 1006 includes a step 1008 between steps 308 and 310. During the sensing procedure carried out to identify the candidate resources at step 308, UE-B estimates the RSRP values for all the resources in the resource selection window. At step 1008, the processor of the UE updates the RSRP for the non-preferred resources as:

RSRP for a non-preferred resource
$R$=RSRP_estimated over $R$+RSRP_indicated by
UE-$A$ for $R$ (received at step 1004)

This serves to assign a negative weight to these non-preferred resources in the resource selection procedure in proportion to their (bad) quality (non-preference) at UE-A. An advantage of process 1000 lies in the fact that the non-preferred resources are effectively assigned negative weight as communicated by UE-A, who will receive data over the finally selected resource.

In a more general form of coordination, UE-A may determine and send, at step 406, to UE-B a set of preferred resources and a set of non-preferred resources. In addition, among these sets, the resources may be ranked into subsets with respect to their quality. This was proposed in step 1002 for non-preferred resources and similar extensions can be derived for preferred resources. To perform resource selection making use of such comprehensive coordination inputs, UE-B may apply a suitable strategy for the set of preferred resources and a suitable strategy for non-preferred resources among the methods 300, 500, 600 or 800. Any combinations of the previously described methods may be applied for such resource selection.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method for selecting resources for a transmission between a first UE and a second UE, the method carried out at the second UE and comprising:
    receiving, from the first UE, a set of coordination resources, wherein the set of coordination resources comprises an indication of resources that are preferred by the first UE;
    receiving a set of threshold values of Reference Signal Received Power, the set of threshold values including a threshold value of Reference Signal Received Power for each potential combination of transmission priority value and reservation priority value;
    sensing a set of resources within a resource selection window for the transmission, wherein each resource in the set of resources is associated with a value of Reference Signal Received Power;
    receiving a value of priority of the transmission;
    identifying, from the set of resources, a first subset of resources, wherein the first subset of resources comprises resources which are selectable for the transmission based on the set of threshold values and the value of priority of the transmission;
    determining the proportion of the number of resources in the first subset of resources relative to the number of resources in the set of resources; and
    in the event that the proportion of the number of resources in the first subset of resources relative to the number of resources in the set of resources is greater than or equal to a predetermined proportion:
        determining the number of resources in the first subset of resources which are indicated as being preferred by the first UE in the set of coordination resources; and
        in the event that the number of resources in the first subset of resources which are indicated as being preferred by the first UE in the set of coordination resources is greater than or equal to one, selecting one of the resources in the first subset of resources which are indicated as being preferred by the first UE in the set of coordination resources.

2. The method of claim 1, comprising, in the event that the number of resources in the first subset of resources which are indicated as being preferred by the first UE in the set of coordination resources is zero:
    determining an increased proportion, wherein the increased proportion is higher than the predetermined portion;
    in the event that the proportion of the number of resources in the first subset of resources relative to the number of resources in the set of resources is greater than or equal to the increased proportion:
        determining the number of resources in the first subset of resources which are indicated as being preferred by the first UE in the set of coordination resources; and
        in the event that the number of resources in the first subset of resources which are indicated as being preferred by the first UE in the set of coordination resources is greater than or equal to one, selecting one of the resources in the first subset of resources which are indicated as being preferred by the first UE in the set of coordination resources.

3. The method of claim 1, wherein the set of coordination resources comprises an indication of resources that are not preferred by the first UE.

4. A method for selecting resources for a transmission between a first UE and a second UE, the method carried out at the second UE and comprising:
receiving, from the first UE, a set of coordination resources, wherein the set of coordination resources comprises an indication of resources that are not preferred by the first UE;
receiving a set of threshold values of Reference Signal Received Power, the set of threshold values including a threshold value of Reference Signal Received Power for each potential combination of transmission priority value and reservation priority value;
sensing a set of resources within a resource selection window for the transmission, wherein each resource in the set of resources is associated with a value of Reference Signal Received Power;
receiving a value of priority of the transmission;
identifying, from the set of resources, a first subset of resources, wherein the first subset of resources comprises resources which are selectable for the transmission based on the set of threshold values and the value of priority of the transmission;
identifying, from the first subset of resources, a second subset of resources, wherein the second subset of resources excludes resources which are indicated as being not preferred by the first UE in the set of coordination resources;
determining the proportion of the number of resources in the second subset of resources relative to the number of resources in the set of resources; and
in the event that the proportion of the number of resources in the second subset of resources relative to the number of resources in the set of resources is greater than or equal to a predetermined proportion, selecting at least one resource of the second subset of resources for the transmission.

5. The method of claim 4, comprising, in the event that the proportion of the number of resources in the second subset of resources relative to the number of resources in the set of resources is less than the predetermined proportion:
increasing each of the threshold values in the set of threshold values;
identifying a third subset of resources, wherein the third subset of resources comprises resources of the first subset of resources which are selectable for the transmission based on the increased threshold values and the value of priority of the transmission;
determining the proportion of the number of resources in the third subset of resources relative to the number of resources in the set of resources; and
in the event that the proportion of the number of resources in the third subset of resources relative to the number of resources in the set of resources is greater than or equal to the predetermined proportion, selecting at least one resource of the third subset of resources for the transmission.

6. The method of claim 4, wherein the set of coordination resources comprises an indication of resources that are preferred by the first UE.

7. The method of claim 4, comprising receiving the predetermined proportion.

8. The method of claim 1, comprising, in the event that the proportion of the number of resources in the first subset of resources relative to the number of resources in the set of resources is less than the predetermined proportion:
increasing each of the threshold values in the set of threshold values;
identifying a second subset of resources, wherein the second subset of resources comprises resources of the set of resources which are selectable for the transmission based on the increased threshold values and the value of priority of the transmission;
determining the proportion of the number of resources in the second subset of resources relative to the number of resources in the set of resources; and
in the event that the proportion of the number of resources in the second subset of resources relative to the number of resources in the set of resources is greater than or equal to the predetermined proportion, selecting at least one resource of the second subset of resources for the transmission.

9. A method of signalling resources for a transmission between a first UE and a second UE, the method carried out at the first UE and comprising:
receiving a set of threshold values of Reference Signal Received Power, the set of threshold values including a threshold value of Reference Signal Received Power for each potential combination of transmission priority value and reservation priority value;
sensing a set of resources within a resource selection window for the transmission, wherein each resource in the set of resources is associated with a value of Reference Signal Received Power;
receiving a value of priority of the transmission;
identifying, from the set of resources, a first subset of resources, wherein the first subset of resources comprises resources which are selectable for the transmission based on the set of threshold values and the value of priority of the transmission;
determining a set of coordination resources, wherein the set of coordination resources comprises an indication of resources that are not preferred by the first UE; and
sending, to the second UE, the set of coordination resources; determining the proportion of the number of resources in the first subset of resources relative to the number of resources in the set of resources; and
in the event that the proportion of the number of resources in the first subset of resources relative to the number of resources in the set of resources is greater than or equal to a predetermined proportion, selecting at least one resource of the third subset of resources for the transmission.

10. The method of claim 9, comprising, prior to sending the set of coordination resources, assigning each of the not preferred resources in the set of coordination resources an indication of a predetermined value of Reference Signal Received Power based on an intended usage by the first UE of the respective not preferred resource.

11. The method of claims 9, wherein the set of coordination resources comprises an indication of resources that are preferred by the first UE.

12. The method of claims 4, wherein the set of coordination resources comprises the set of resources not suitable for its reception due to duplex.

* * * * *